(No Model.)
J. W. ABBOTT.
COFFEE POT.
No. 478,075. Patented July 5, 1892.
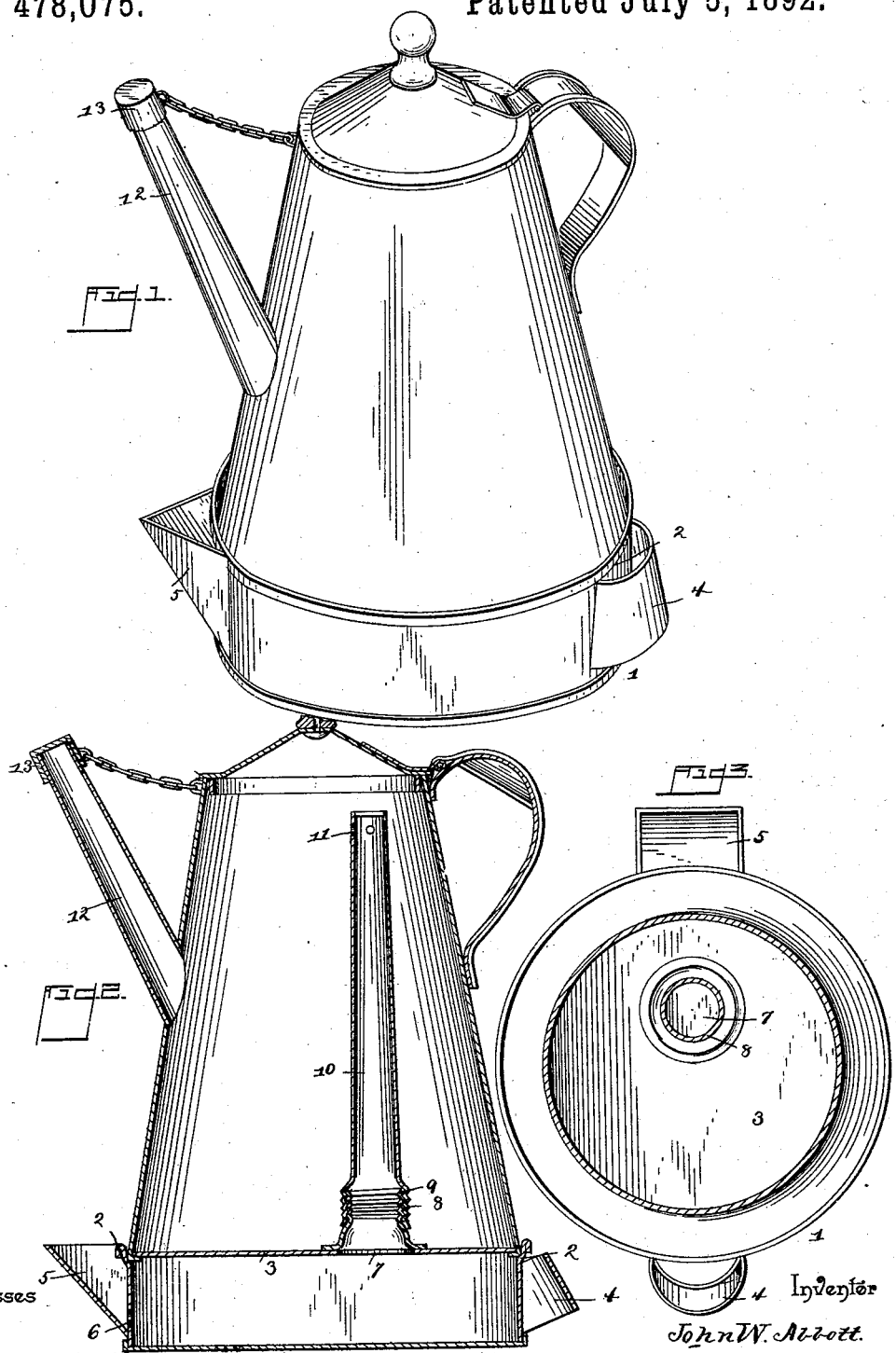
Witnesses
Chas. A. Ford
H. J. Riley
Inventor
John W. Abbott.
By his Attorneys,
C. A. Snow & Co.
THE NORRIS PETERS CO., PHOTO-LITHO., WASHINGTON, D. C.

UNITED STATES PATENT OFFICE.

JOHN W. ABBOTT, OF RUSHVILLE, NEW YORK.

COFFEE-POT.

SPECIFICATION forming part of Letters Patent No. 478,075, dated July 5, 1892.

Application filed May 27, 1891. Serial No. 394,282. (No model.)

*To all whom it may concern:*

Be it known that I, JOHN W. ABBOTT, a citizen of the United States, residing at Rushville, in the county of Yates and State of New York, have invented a new and useful Coffee-Pot, of which the following is a specification.

The invention relates to improvements in coffee-pots.

The object of the present invention is to improve the construction of coffee-pots and enable them to retain and confine the aroma of coffee and to insure a fine flavor.

The invention consists in the construction and novel combination and arrangement of parts hereinafter fully described, illustrated in the accompanying drawings, and pointed out in the claim hereto appended.

In the drawings, Figure 1 is a perspective view of a coffee-pot constructed in accordance with this invention. Fig. 2 is a vertical longitudinal sectional view. Fig. 3 is a horizontal sectional view.

Referring to the accompanying drawings, 1 designates a reservoir or pan adapted to hold water and provided at its upper edge with a circumferential flange 2 to receive and hold the bottom of a coffee-pot 3, which is placed over the pan or reservoir 1 and is adapted to receive steam given off by the pan when the water within it boils. The pan or reservoir is provided at one side with a handle 4 and at a diametrically opposite point with a lip 5 and perforations 6, which enable the pan or reservoir to be supplied with water when the coffee-pot is in position, and which enable the water to be poured off.

The bottom of the coffee-pot is provided with a circular opening 7 and an inwardly-extending threaded flange 8, arranged around the opening, and the flange 8 is adapted to be engaged by a lower threaded end 9 of a tube 10, which is arranged within the coffee-pot and extends to the top thereof and is provided with a series of perforations 11 to permit the passage of steam to the interior of the coffee-pot. The tube is adapted to be readily removed from the coffee-pot by unscrewing it from the coffee-pot flange to enable it to be cleaned, and the upper end of the tube may be provided with a separate cap provided with perforations, or the upper end may, as illustrated in the accompanying drawings, be closed and provided with perforations. The spout 12 is provided with a removable cap 13, which when coffee is being made is placed on the spout to close the end to confine the aroma of the coffee.

It will be seen that the coffee-pot is simple and comparatively inexpensive and is capable of being readily handled, and its parts may be readily removed and separated for the purpose of cleaning, and that the aroma of coffee is confined.

From the foregoing description and the accompanying drawings the construction, operation, and advantages of the invention will readily be understood.

What I claim is—

The combination of the reservoir or pan provided at its upper edge with a circumferential flange forming a seat, a lip arranged at one side of the reservoir or pan and enabling the same to be filled at the side, a coffee-pot arranged on the seat and having in its bottom a circular opening and a threaded flange around the opening, the removable tube having its lower end threaded and engaging the threaded flange, and its upper end closed and provided with perforations, and a cap for the spout of the pot, substantially as described.

In testimony that I claim the foregoing as my own I have hereto affixed my signature in presence of two witnesses.

JOHN W. ABBOTT.

Witnesses:
  EMMETT A. FOSTER,
  M. W. FISHER.